C. J. DORFF.
TIRE VALVE.
APPLICATION FILED OCT. 16, 1915.

1,207,882.

Patented Dec. 12, 1916.

Witness:
John Enders

Inventor:
Conrad J. Dorff,
by Robert Burns
Atty.

UNITED STATES PATENT OFFICE.

CONRAD J. DORFF, OF CHICAGO, ILLINOIS.

TIRE-VALVE.

1,207,882. Specification of Letters Patent. Patented Dec. 12, 1916.

Application filed October 16, 1915. Serial No. 56,175.

*To all whom it may concern:*

Be it known that I, CONRAD J. DORFF, a citizen of the United States of America, and a resident of Chicago, in the county of Cook and State of Illinois, have invented certain new and useful Improvements in Tire-Valves, of which the following is a specification.

This invention relates to that type of safety valves for pneumatic tires in which a mechanism operating under a predetermined pressure is adapted to open a blow-off and permit an escape of excess pressure. And the present improvement has for its object to provide a simple and efficient structural formation and combination of parts in a pressure actuated mechanism of a tire valve, adapted to provide a sensitive and accurate operation with an avoidance of excess friction, all as will hereinafter more fully appear.

Figure 1:
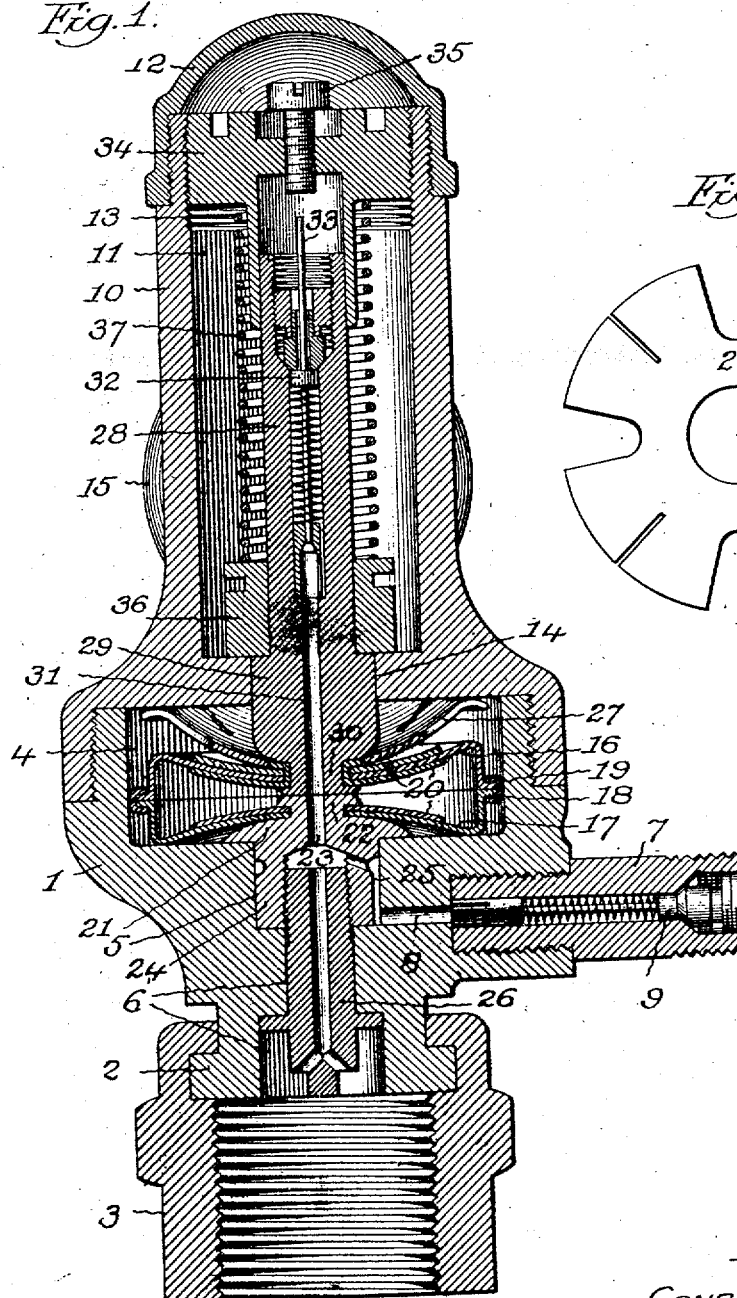
Figure 2:
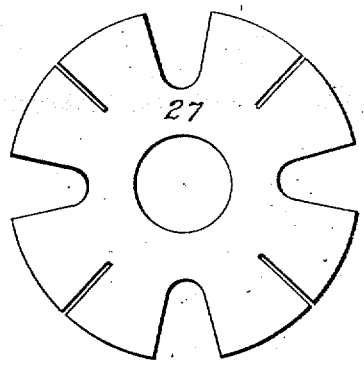

In the accompanying drawings: Figure 1, is an enlarged central section of a blow-off tire valve embodying the present improvements. Fig. 2, is a plan view of the main cup-shape spring or abutment plate for the expansion casing of the structure.

Similar reference numerals indicate like parts in both views.

Referring to the drawing, 1 designates the cup-shape base member of the mechanism formed at its lower end with a coupling neck 2 upon which is revolubly mounted a coupling sleeve 3 adapted for screw-threaded engagement with the outer end of the usual filling tube or nipple of a pneumatic tire.

4 designates an open top main upper chamber formed in the expanded upper portion of the base member 1, for the reception of the expansion member hereinafter described.

5 designates an intermediate sub-chamber formed in the base member 1, beneath the aforesaid main chamber 4, and adapted to receive and form a support for the stationary abutment member of the expansion member above referred to.

6 designates a lower chamber or shouldered counter bore formed in the base member 1 below the sub-chamber 5 and adapted to receive the hereinafter described tubular and shouldered nipple by which the stationary abutment member, above referred to, is secured in place.

7 designates a laterally disposed valve casing screwing into a side of the base member 1, with its central bore communicating by a branch passage 8 with the sub-chamber 5, above described.

9 designates a check valve, preferably of the type known to the trade as the Schraeder valve, and disposed in the usual manner in the valve casing 7, to prevent a reflux of the air used in filling the pneumatic tire.

10 designates the upper housing of the casing of the present tire valve, formed with an expanded lower portion adapted to screw onto the upper end of the base member 1 and form a closure for the upper end of the main chamber 4 of said base member.

11 designates an elongated chamber formed in the housing 10, its upper end being provided with a closure cap 12 and with an internally screw-threaded portion 13 for the attachment of the adjustable abutment collar hereinafter described.

14 designates a passage or orifice at the lower end of the chamber 11, connecting the same with the aforesaid chamber 4 of the base member 1.

15 designates a laterally extending neck on the housing 10, adapted to contain a visible pressure indicating mechanism, when such mechanism is desired in connection with the present "blow-off" mechanism and actuated thereby. No claim to novelty is made in the present case to such provision and accordingly the same is neither shown or described in detail.

16 and 17 designate upper and lower flexible pistons or diaphragms, preferably formed by a pair of reversely arranged cup-shaped members, the marginal meeting edges of which are formed with out turned flanges 18 over which is swaged an annular coupling band 19 of a channel form in cross-section, to secure the two members together in an air tight manner. With the described construction, a chamber is formed between the diaphragms 16, 17, adapted to receive air from the tire and at the pressure prevailing therein, and so that the diaphragms will have movement to and from each other in accordance with the varied pressures existing within the tire.

20 designates reinforcing disks associated with the aforesaid diaphragms 16, 17, for strengthening and increasing the resiliency of the same.

21 designates the stationary abutment member of the lower diaphragm 17, formed with a convex upper bearing surface for said diaphragm, and with a central nipple 22, adapted to pass through a central orifice in said diaphragm and its reinforcing disk 20, and be swaged thereover as shown. Said abutment member is also provided with a central orifice 23 communicating with the interior of the chamber between the diaphragms 16, 17, above described, and adapted to introduce a pressure of air into said chamber.

24 designates a depending tubular shank on the abutment member 21, fitting the aforesaid chamber 5 of the base member 1 and having a screw-threaded central bore adapted for engagement with the attaching nipple hereinafter described. The usual ports or passages 25 are formed in the shank 24 to permit the passage of air between the branch passage 9, and the central bore of the shank 24, and the interior of the pneumatic tire.

26 designates the tubular shouldered nipple, above referred to, and which is arranged in the lower sub-chamber 6, aforesaid, and screws into the central bore of the shank 24 to secure the stationary abutment member 21 in place.

27 designates a radially slotted cup-shaped spring abutment member, the marginally slitted portion of which has bearing against the under face of the aforesaid housing 10, while its central portion has bearing association with the upper diaphragm 16. The function of said spring is to yieldingly force the aforesaid diaphragms 16, 17, together against air pressure normally prevailing between said diaphragms.

28 designates a movable valve carrying head, having longitudinal movement in the chamber 11 of the upper housing 10, and having guiding movement in bottom orifice 14 of said chamber, preferably by means of a lower expanded portion 29, as shown. Said valve carrying head 28 is fixedly attached to the upper diaphragm 16 aforesaid, by a central attaching nipple 30 passing through a central orifice in said diaphragm 16 and in the associated disks 20 and spring member 27, and clenched against the inner of said reinforcing disks 20, as shown.

31 designates the longitudinal bore or passage of the valve carrying head 28, extending from end to end of said head and communicating at its lower end with the chamber between the diaphragms 16, 17, aforesaid. Said bore 31 is preferably of the stepped formation shown and is adapted to contain an inwardly opening spring actuated valve 32, preferably of the well known Schraeder type shown, with the stem 33 of said valve extending beyond the end of the head 28, for automatic operation by means hereinafter described.

34 designates an externally screw-threaded abutment collar screwing into the screw-threaded upper portion 13 of the upper housing 10, aforesaid, and having a central guide bore for the upper end of the valve carrying head 28 aforesaid.

35 designates an adjustable abutment screw arranged centrally in the abutment collar 34 and in alinement with the valve stem 33 aforesaid. The arrangement is such that as the valve carrying head 28 moves upward under an excessive pressure in the tire, and as a predetermined pressure is reached, the valve stem 33 will contact with the screw 35 and the valve 32 forced open to permit an escape of an excess of air from the tire.

36 designates an abutment collar carried near the lower end of the valve carrying head 28, and forming the lower abutment for the auxiliary spring hereinafter described. As usual in the present type of tire valves the collar 36 will have operative connection with the finger or pointer of the usual pressure indicating mechanism located in the lateral neck 15 of the housing 10, heretofore referred to.

37 designates an auxiliary spring disposed between the above described abutment collar 34 and 36, and acting as an adjustable auxiliary to the main cup-shaped spring 27, heretofore described, in providing a resilient resistance to an opening or blow-off movement of the parts heretofore described.

Having thus fully described my said invention what I claim as new and desire to secure by Letters Patent, is:—

1. In a tire valve, the combination of a main casing adapted for attachment to the filling tube of a pneumatic tire and formed with an upper chamber and an intermediate main chamber, an expansion member arranged in the aforesaid main chamber and comprising upper and lower diaphragms connected together by an annular marginal wall, a dished spring having central bearing on the upper diaphragm and marginal bearing in the main chamber aforesaid, a carrying head attached centrally to said spring and upper diaphragm and moving therewith, an inwardly opening check valve arranged in said carrying head and provided with an axially arranged stem, and an abutment for said valve stem associated with the main casing, substantially as set forth.

2. In a tire valve, the combination of a main casing adapted for attachment to the filling tube of a pneumatic tire and formed with an upper chamber and an intermediate main chamber, an expansion member arranged in the aforesaid main chamber and adapted under varying pressures to have movement in an outward direction, a carrying head attached to said expansion member and moving therewith, an inwardly opening check valve arranged in said carrying head and provided with an axially arranged stem, an externally screw-threaded abutment collar engaging a screw-thread formation of the upper chamber of the main casing and formed for guiding engagement with the outer end of the carrying head aforesaid, an abutment screw arranged in said abutment collar in axial alinement with the valve stem aforesaid, and a spring encircling the carrying head and having bearing on its lower end on said head and at its upper end against said abutment collar, substantially as set forth.

3. In a tire valve, the combination of a main casing adapted for attachment to the filling tube of a pneumatic tire and formed with an upper chamber and an intermediate main chamber, an expansion member arranged in the aforesaid main chamber and comprising upper and lower diaphragms connected together by an annular marginal wall, an abutment member attached to the lower diaphragm, a hollow shouldered nipple attaching said abutment member in place, a carrying head centrally associated with said upper diaphragm and moving therewith, an inwardly opening check valve arranged in said carrying head and provided with an axially arranged stem, an abutment for said valve stem associated with the main casing, and resilient means for moving the carrying head and upper diaphragm in a downward direction, substantially as set forth.

4. In a tire valve, the combination of a main casing adapted for attachment to the filling tube of a pneumatic tire, a pair of diaphragms arranged in said casing and connected together to form a pressure receiving chamber, an abutment member attached to the lowermost diaphragm aforesaid, a hollow shouldered nipple attaching said abutment member in place, a cup-shaped abutment spring associated with the uppermost diaphragm aforesaid, a movable valve carrying head connected to said uppermost diaphragm and provided with an abutment collar near its lower end, an inwardly opening check valve in said carrying head, an adjustable abutment collar arranged in the upper part of the main casing and having guiding engagement with the valve carrying head aforesaid, an adjustable abutment screw arranged in said abutment collar in longitudinal alinement with the aforesaid inwardly opening valve, and a spring arranged between the aforesaid abutment collars, substantially as set forth.

Signed at Chicago, Illinois, this 12th day of October, 1915.

CONRAD J. DORFF.